US009045932B2

(12) United States Patent
Laukhuf et al.

(10) Patent No.: US 9,045,932 B2
(45) Date of Patent: Jun. 2, 2015

(54) HOLE SEAL

(71) Applicant: Allied Moulded Products, Inc., Bryan, OH (US)

(72) Inventors: Gregg E. Laukhuf, Bryan, OH (US); Michael Todd Jackson, Auburn, IN (US); Andrew Brent Mendenhall, Mooresville, IN (US); Todd Christopher Midkiff, Noblesville, IN (US)

(73) Assignee: Allied Moulded Products, Inc., Bryan, OH (US)

( * ) Notice: Subject to any disclaimer, the term of this patent is extended or adjusted under 35 U.S.C. 154(b) by 43 days.

(21) Appl. No.: 13/803,158

(22) Filed: Mar. 14, 2013

(65) Prior Publication Data
US 2013/0263515 A1 Oct. 10, 2013

Related U.S. Application Data

(60) Provisional application No. 61/620,617, filed on Apr. 5, 2012.

(51) Int. Cl.
| *B62D 25/24* | (2006.01) |
| *E06B 7/22* | (2006.01) |
| *H02B 1/30* | (2006.01) |
| *H02G 3/08* | (2006.01) |

(52) U.S. Cl.
CPC . *E06B 7/22* (2013.01); *B62D 25/24* (2013.01); *H02B 1/305* (2013.01); *H02G 3/083* (2013.01)

(58) Field of Classification Search
CPC .................................. E06B 1/00; B62D 25/24

USPC ......... 220/234, 235, 800, 802, 803, 804, 327, 220/328, 233, 236, DIG. 19; 49/463
See application file for complete search history.

(56) References Cited

U.S. PATENT DOCUMENTS

| 3,443,716 | A | * | 5/1969 | Evans ............................ 220/235 |
| 3,858,612 | A | * | 1/1975 | Van Steenburg ................ 138/89 |
| 4,301,629 | A | * | 11/1981 | Farr ................................... 52/99 |
| 4,316,550 | A | * | 2/1982 | de Winter ..................... 215/360 |
| 4,401,228 | A | * | 8/1983 | Baldelli ......................... 220/235 |
| 4,440,309 | A | * | 4/1984 | Morimoto ..................... 220/235 |
| 5,167,340 | A | | 12/1992 | Shaw |
| 5,197,840 | A | | 3/1993 | Peek |
| 5,327,942 | A | | 7/1994 | Black |
| 5,329,971 | A | * | 7/1994 | Condon ......................... 138/89 |
| 5,468,108 | A | | 11/1995 | Sullivan et al. |
| 5,505,324 | A | | 4/1996 | Danico |
| 5,695,307 | A | * | 12/1997 | Takahashi ..................... 411/508 |
| 5,716,161 | A | | 2/1998 | Moore et al. |

(Continued)

*Primary Examiner* — Fenn Matthew
*Assistant Examiner* — Christopher McKinley
(74) *Attorney, Agent, or Firm* — Fraser Clemens Martin & Miller LLC; James D. Miller

(57) ABSTRACT

A hole seal is disclosed including a cover having a body with an inner surface and an outer surface and an end portion attached to a first end of the body. The inner surface of the body includes a threaded portion, and the outer surface of the body includes an annular array of ribs disposed thereon. Each of the ribs has a predefined collapsible direction. The end portion includes a seal disposed on a peripheral edge of the end portion. The hole seal further includes a cap having an inner member and an outer portion. The inner member includes a threaded portion that is configured to cooperate with the threaded portion of the inner surface of the body.

19 Claims, 2 Drawing Sheets

(56) References Cited

U.S. PATENT DOCUMENTS

| | | | |
|---|---|---|---|
| 5,740,935 A * | 4/1998 | Desfarges | 217/110 |
| 6,218,611 B1 * | 4/2001 | Bias | 174/359 |
| 6,769,849 B2 * | 8/2004 | Yoneoka | 411/45 |
| 6,971,534 B1 * | 12/2005 | Helms | 220/327 |
| 7,128,212 B2 | 10/2006 | Gargano et al. | |
| 7,347,655 B2 | 3/2008 | Nagasawa et al. | |
| 7,614,836 B2 | 11/2009 | Mohiuddin et al. | |
| 7,862,272 B2 * | 1/2011 | Nakajima | 411/45 |
| 7,891,151 B2 * | 2/2011 | Sano | 52/506.05 |
| 7,896,601 B2 * | 3/2011 | Kalyanadurga et al. | 411/510 |
| 7,954,660 B2 | 6/2011 | Fishman | |
| 8,043,038 B2 | 10/2011 | Sano | |
| 8,046,879 B2 * | 11/2011 | Werner et al. | 24/297 |
| 8,371,789 B2 * | 2/2013 | Takita | 411/508 |
| 8,495,802 B2 * | 7/2013 | Okada et al. | 24/297 |
| 8,533,919 B2 * | 9/2013 | Schliessner | 24/458 |
| 2004/0020016 A1 * | 2/2004 | Yoneoka | 24/297 |
| 2004/0083593 A1 * | 5/2004 | Jackson et al. | 29/456 |
| 2006/0099051 A1 * | 5/2006 | Moerke | 411/508 |
| 2007/0062962 A1 * | 3/2007 | Iwahara | 220/796 |
| 2008/0031702 A1 | 2/2008 | Chen et al. | |
| 2008/0142517 A1 * | 6/2008 | Nakazato | 220/201 |
| 2008/0193258 A1 | 8/2008 | Legat et al. | |
| 2010/0018737 A1 * | 1/2010 | Jackson et al. | 174/50 |

* cited by examiner

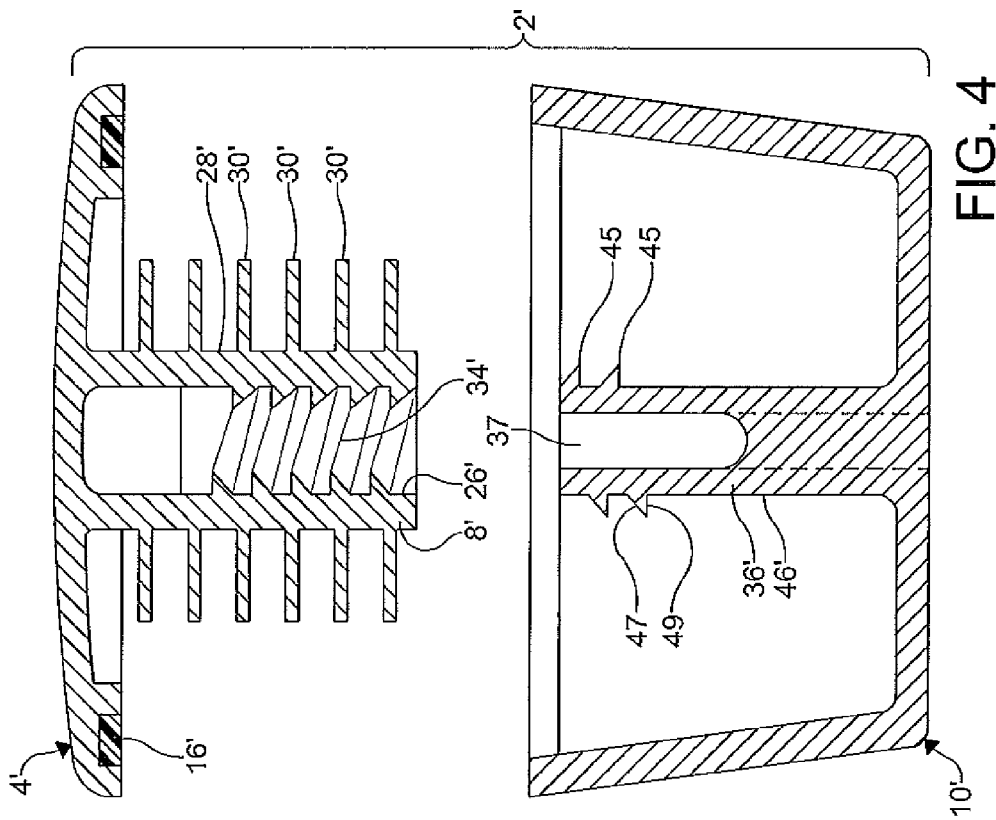
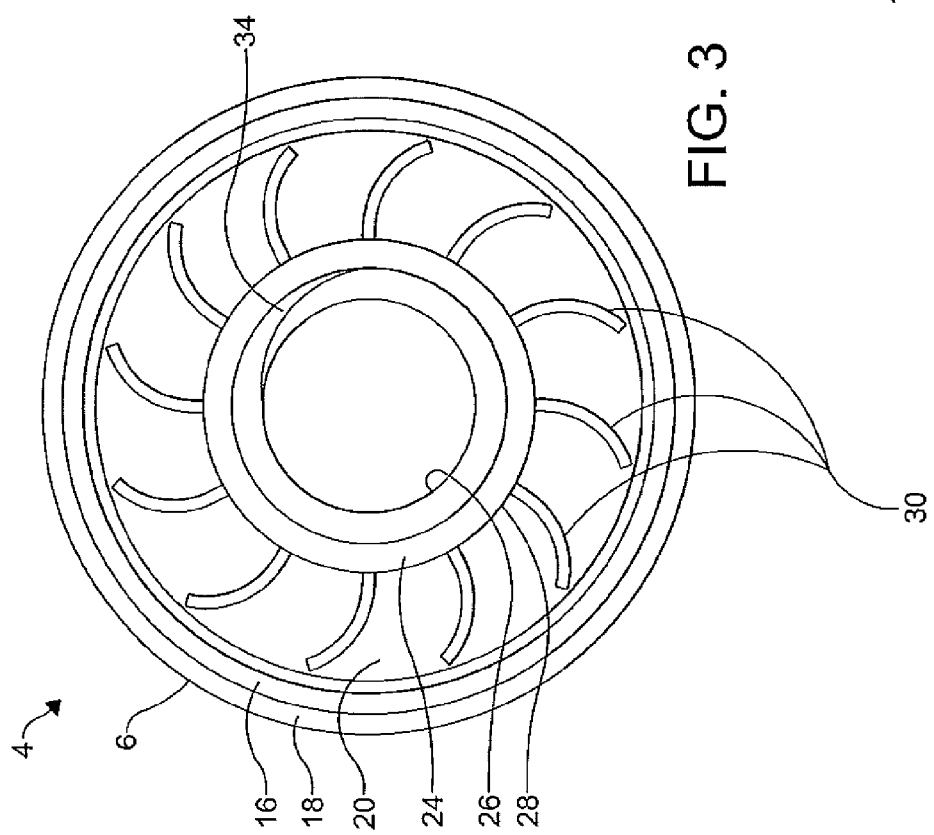

HOLE SEAL

CROSS-REFERENCE TO RELATED APPLICATIONS

This application claims priority to U.S. Provisional Patent Application Ser. No. 61/620,617 filed Apr. 5, 2012, which is hereby incorporated herein by reference in its entirety.

FIELD OF THE INVENTION

The invention relates to a hole seal, and more specifically, to a hole seal for use with industrial enclosures such as electrical enclosures.

BACKGROUND OF THE INVENTION

Industrial enclosures are often used to house electrical and other systems and to protect wiring and control mechanisms of those systems from outside elements and corrosives. Typically, industrial enclosures include holes through which electrical lines and other equipment can pass through. When the holes are not in use, various hole seals are commonly used to cover the open holes in the enclosures to maintain the original enclosure integrity.

Many types of hole seals are currently available. Hole seals often include a first component that connects to a second component through the hole, thereby covering the hole. Many hole seals include features that allow users to use the same hole seal to cover holes having various shapes and sizes. Additional features may relate to specific fastening mechanisms.

Many of the hole seals currently available are not capable of centering the hole seal in the hole formed in the enclosure. Additionally, such hole seals may require a user to manually locate a first component in the hole from one side while the user must also manually connect the second component through the hole from an opposing side. This occurs because many of the available hole seals do not feature a component capable of being securely retained in the hole prior to connection to the second component. For instance, some hole seals that require rotation of one component during an installation process may slip or spin within the hole unless the user manually operates both components. Furthermore, the hole seals may not remain tightly fastened when installed according to a manufacturer's specifications.

It would therefore be desirable to have a hole seal that is easily centered in a hole and that includes an easy, fast tightening mechanism that militates against the hole seal spinning in the hole during and after installation.

SUMMARY OF THE INVENTION

Consonant with the present invention, a hole seal that is easily centered in a hole and that includes an easy, fast tightening mechanism that militates against the hole seal spinning during and after installation, has surprisingly been discovered.

In an embodiment of the invention, a hole seal comprises a cover including a body having an inner surface and an outer surface. The outer surface of the body includes an annular array of ribs disposed thereon. The hole seal further includes a cap having an inner member. The inner member is configured to cooperate with the inner surface of the body to attach the cap to the cover.

In another embodiment of the invention, a hole seal comprises a cover including an end portion and a body, wherein the body is hollow and substantially cylindrical, the body having a first end attached to an inner surface of the end portion and an open second end, a longitudinal axis of the body extending from the first end to the second end of the body. The body further includes an inner surface and an outer surface, the inner surface of the body including a threaded portion and the outer surface of the body including an annular array of flexible ribs disposed thereon. The hole seal further comprises a cap having an inner member and an outer portion, the inner member including a threaded portion configured to cooperate with the threaded portion of the inner surface of the body to attach the cap to the cover. The outer portion forms an annular surface that substantially corresponds to an annular seal disposed on the inner surface of the end portion of the cover.

In another embodiment of the invention, a hole seal comprises a cover including an end portion and a body, wherein the body is hollow and substantially cylindrical, the body having a first end attached to an inner surface of the end portion and an open second end, a longitudinal axis of the body extending from the first end to the second end of the body. The body further includes an inner surface and an outer surface, the inner surface of the body including a threaded portion and the outer surface of the body including an annular array of flexible ribs disposed thereon. Each of the ribs extends radially outwardly from the outer surface of the body and is attached to the outer surface of the body along an area of attachment extending from the first end of the body to the second end of the body, each of the areas of attachment substantially parallel to the longitudinal axis of the body. Each of the ribs is also resilient and each has a predetermined curvature causing each of the ribs to have a predetermined collapsible position. The hole seal further comprises an annular seal disposed on the inner surface of the end portion of the cover and a cap having an inner member and an outer portion, the inner member including a threaded portion configured to cooperate with the threaded portion of the inner surface of the body to attach the cap to the cover. The outer portion forms an annular surface that substantially corresponds to the annular seal disposed on the end portion of the cover.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The above, as well as other advantages of the present invention, will become readily apparent to those skilled in the art from the following detailed description when considered in the light of the accompanying drawings, in which:

FIG. 3 is a front elevational view of the cover shown in FIG. 1; and

FIG. 4 is cross-sectional top plan view of the cover and cap according to another embodiment of the invention.

DETAILED DESCRIPTION OF AN EMBODIMENT OF THE INVENTION

The following detailed description and appended drawings describe and illustrate an exemplary embodiment of the invention. The description and drawings serve to enable one skilled in the art to make and use the invention, and are not intended to limit the scope of the invention in any manner.

Figure 1:
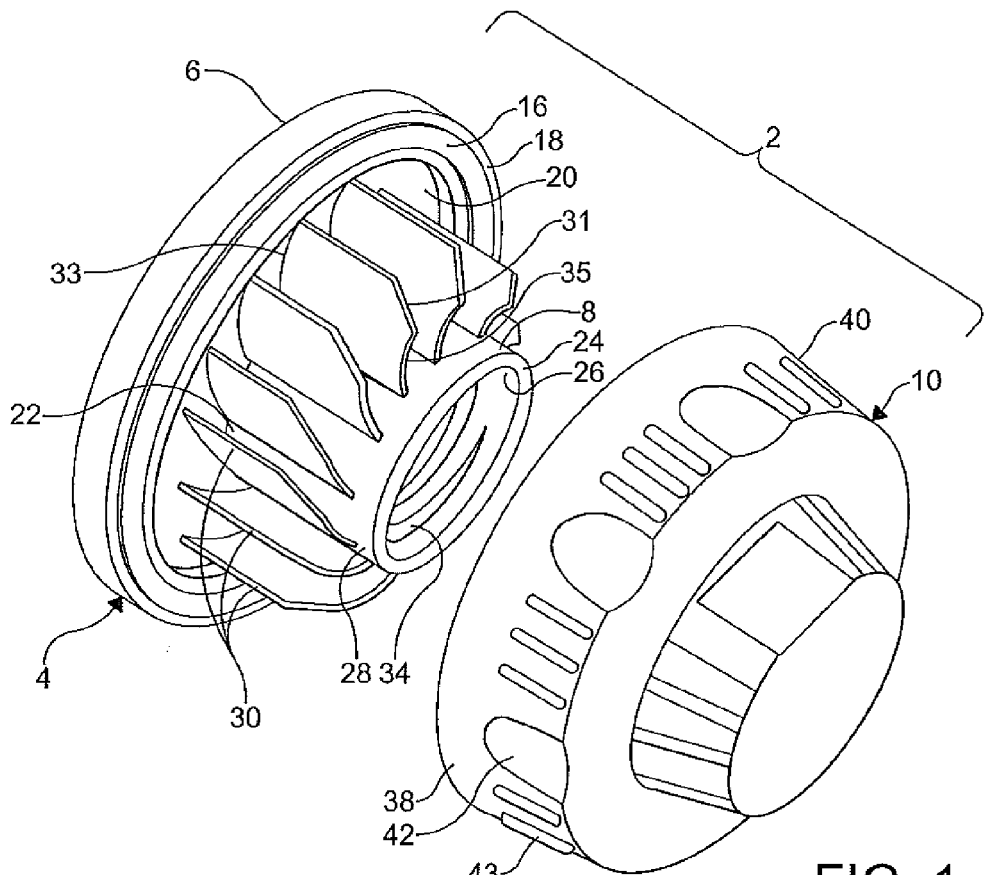
FIG. 1 is an exploded side perspective view of a hole seal including a cover and a cap according to an embodiment of the present disclosure.
Figure 2:
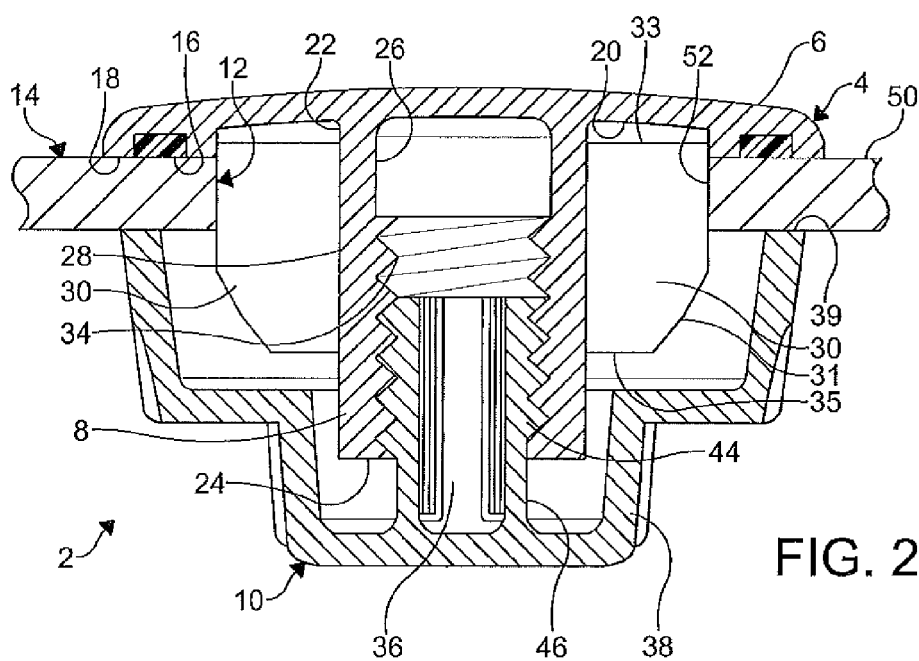
FIG. 2 is a fragmentary cross-sectional top plan view of the cover and cap shown in FIG. 1, the cover and cap fastened to one another in a hole in an enclosure.

Referring to FIGS. 1-3, there is illustrated a hole seal, generally indicated by reference numeral 2. The hole seal 2 includes a cover 4 and a cap 10, wherein the cover 4 and the cap 10 cooperate with each other to cover a hole 12 formed in an enclosure 14.

The cover 4 is typically made from plastic or metal, but any material capable of withstanding strain from repeated connection to, and cooperation with, the cap 10 may be used. Any cover 4 having a shape and size capable of covering the hole 12 in the enclosure 14 and connecting with the cap 10 may be used. The cover 4 may be formed from one part or multiple parts integrated together.

An end portion 6 typically has a disc shape, but the end portion 6 may be any size and shape appropriate for covering the hole 12 of the enclosure 14 and is usually dependent on the size and shape of the hole 12. Plastic, rubber, metal, or any other appropriate material may be used to form the end portion 6. The end portion 6 includes a substantially planar outer surface that provides an inconspicuous appearance for the hole seal 2 when the hole seal 2 is viewed from an exterior of the enclosure 14. The end portion 6 further includes an inner surface 18 opposite the outer surface. The inner surface 18 is in facing relationship with the cap 10 when the cover 4 cooperates with the cap 10 to cover the hole 12. The end portion 6 may include an annular seal 16, for example, an o-ring or other type of gasket, disposed on the inner surface 18 of the end portion 6 to substantially surround the hole 12. The seal 16 may be disposed on the inner surface 18 adjacent and spaced apart from a peripheral edge of the inner surface 18 or the seal 16 may be disposed along the peripheral edge of the inner surface 18. It should be understood that any arrangement of the seal 16 may be utilized so long as the seal 16 abuts an outer surface 50 of the enclosure 14 surrounding the hole 12 during installation of the cover 4, as shown in FIG. 2. Additionally, the inner surface 18 may include an indent or pocket 20 formed therein, wherein the pocket 20 may be recessed with respect to a peripheral portion of the inner surface 18 that may include the seal 16. If the pocket 20 is not utilized, the inner surface 18 of the end portion 6 may be a substantially planar surface with the exception of the seal 16 and a body 8 extending from the inner surface 18.

The body 8 is typically a hollow cylinder having a first end 22 connected to the inner surface 18 of the end portion 6 and a second end 24 extending outwardly from the inner surface 18 of the end portion 6, a longitudinal axis of the body 8 extending from the first end 22 to the second end 24 of the body. The second end 24 of the body 8 is open to receive at least a portion of the cap 10 therein. Plastic, rubber, metal, or any other appropriate material may be used to form the body 8. The body 8 and the end portion 6 may be securely attached to each other by traditional attachment methods such as welding or bonding, or they may be formed integrally with each other. The body 8 and the end portion 6 may be formed from the same material or different materials. The body 8 may be any shape and size appropriate for cooperation with the cap 10. An inner surface 26 and an outer surface 28 of the body 8 extend between the first end 22 and the second end 24 thereof. The inner surface 26 of the body 8 may include grooves and/or threads 34 for receiving a portion of the cap 10. The threads 34 may extend along an entire length of the inner surface 26, or for only a portion of the inner surface 26.

In one embodiment of the disclosure, an annular array of ribs 30 is disposed on the outer surface 28 of the body 8. Each rib 30 extends radially outwardly from the outer surface 28 of the body 8. Each of the ribs 30 is attached to the outer surface 28 of the body 8 along an attachment area that extends from the first end 22 of the body 8 to the second end 24 of the body 8, each of the attachment areas being substantially parallel to the longitudinal axis of the body 8. If a pocket 20 is formed in the inner surface 18 of the end portion 6, a portion of a first edge 33 of each rib 30 adjacent the first end 22 of the body 8 may extend into the pocket 20. Alternatively, if a pocket 20 is not formed in the inner surface 18, there may be a clearance provided between the first edge 33 of each of the ribs 30 and the inner surface 18 to allow each of the ribs 30 to flex freely adjacent the first edge 33. The plurality of ribs 30 may be integrally formed with the body 8 or may be a plurality of separate pieces connected to the body 8 by any traditional attachment means such as welding or bonding.

Each rib 30 is substantially non-planar and has a predefined curvature as each of the ribs 30 extends radially outwardly from the body 8, as best shown in FIG. 3. Each of the ribs 30 curves toward a similar predetermined circumferential direction relative to the outer surface 28 of the body 8. The predetermined direction of the curvature may be clockwise when viewing a front end of the cover 4, as shown in FIG. 3, or alternatively, the predetermined direction of the curl may be counter-clockwise, as desired. The curvature of each rib 30 is such that each rib 30 appears to wrap around an axis of curvature parallel to the longitudinal axis of the body 8. Due to the curvature, each rib 30 has a predetermined collapsible position upon insertion into the hole 12. The ribs 30 may be made from plastic, rubber, or any material capable of bending or flexing to form the predetermined collapsible position when placed in the hole 12 of the enclosure 14 and resisting pressure from the cap 10 when the cap 10 is received in the body 8.

Additionally, the ribs 30 may include a tapered edge 31. The ribs 30 are tapered such that the first edge 33 of each rib 30 adjacent the first end 22 of the body extends radially outwardly from the outer surface 28 of the body 8 further than a second edge 35 of each rib 30 adjacent the second end 24 of the body 8. The tapered edge 31 may be a linear angled edge or a gradually sloping edge, as desired. The tapered edge 31 aids each rib 30 in reaching its predetermined collapsible position during an installation of the cover 4, which in turn aids in centering the cover 4 on the hole 12. If the tapered edge 31 contacts an edge formed between the hole 12 and the enclosure 14, the ribs 30 will tend to curl toward the predetermined collapsible position as the cover 4 is extended further into the hole 12. The pocket 20 or the clearance formed between the first edge 33 of each rib 30 and the inner surface 18 of the end portion 6 may allow each of the ribs 30 to reach its predetermined collapsible position more easily as either of the pocket 20 and the clearance provide additional space for each rib 30 to flex and bend during installation of the cover 4.

Each of the ribs 30 is resilient in that each rib 30 tends to return to its original position after having been deformed toward the collapsible position. The resiliency of the ribs 30 aids in centering the cover 4 during installation if the cover 4 is not centrally aligned by the user on the hole 12. This occurs because the ribs 30 that extend in a direction of the misalignment will accordingly undergo a greater degree of deformation than the ribs 30 that extend in a direction opposite of the misalignment. The resilient effect of the ribs 30 tends to realign the cover 4 away from a portion of the array of ribs 30 having the greatest deformation until each of the ribs 30 in the array has undergone a substantially similar degree of deformation, which results in the cover 4 being substantially centered with respect to the hole 12.

The resiliency of the ribs 30 also aids the cover 4 in being securely retained in the hole 12 when a user attempts to attach the cap 10 to the cover 4. If each of the ribs 30 has been deformed toward its predetermined collapsible position, each of the ribs 30 will attempt to return to its normal position, applying a force radially outwardly on an inner surface 52 of the hole 12, securing the cover 4 in the hole 12.

The cap 10 is typically made from plastic or metal, but any material capable of withstanding strain from repeated connection to, and cooperation with, the cover 4 may be used. Any shape and size capable of connecting to the appropriate portion of the cover 4 and securing the cover 4 within the hole 12 formed in the enclosure 14 may be used. The cap 10 may be formed from one part or multiple parts integrated together. Typically, the cap 10 includes an inner member 36 received by the body 8 of the cover 4 and an outer portion 38 secured against a side of the enclosure 14 opposite the cover 4 when the inner member 36 is received by the body 8.

The outer portion 38 typically has the general form of a substantially hollow cylinder having an open end, the open end forming an annular surface 39 for contacting the enclosure 14. The annular surface 39 may substantially correspond in size and shape to the seal 16 disposed on the end portion 6 of the cover 4. An outer surface 40 of the outer portion 38 may include one or more gripping features such as gripping indentations 42 interposed between adjacent gripping protuberances 43 for use during installation. The generally cylindrical outer portion 38 may also include a stepped region to reduce a volume occupied by the outer portion 38, as shown in FIG. 1.

The inner member 36 is dimensioned to be received within the body 8 of the cover 4. The inner member 36 includes an outer surface 46 that may have threads 44, male threads being shown, that cooperate with the threads 34 of the body 8 to attach the cap 10 to the cover 4. The threads 44 may extend along an entire length of the outer surface 46 or they may only extend along only a portion of the outer surface 46. In some circumstances it may be advantageous to form the threads 44 as a single thread extending 360° around the outer surface 46 of the inner member 36. The single thread may be advantageous as it requires less complicated tooling to create and is able to be removed from a mold used to form the inner member 36 more easily as the single thread encounters less frictional forces during the removal process than would multiple threads.

In use, the cap 10 and the cover 4 are selected by a user to have an appropriate shape and size to cover the hole 12 of the enclosure 14. The body 8 of the cover 4 is inserted through the hole 12 of the enclosure 14 so that the seal 16 of the end portion 6 is adjacent the outer surface 50 of the enclosure 14. The body 8 extends through the hole 12 so that the second end 24 of the body 8 can receive the inner member 36 of the cap 10. Once the body 8 is inserted through the hole 12, the seal 16 abuts the outer surface 50 of the enclosure 14 to seal the cover 4 against the enclosure 14. The ribs 30 make contact with the inner surface 52 of the enclosure 14 forming the hole 12, thereby substantially centering and retaining the cover 4 within the hole 12, as described hereinabove. Depending on a diameter or a width of the hole 12, the ribs 30 may collapse into the predetermined collapsible position, which allows the same cover 4 to fit into holes 12 having various diameters or widths.

The outer portion 38 of the cap 10 is then placed around the body 8 of the cover 4 and the threads 44 disposed on the inner member 36 are pushed into contact with the threads 34 located on the inner surface 26 of the body 8. The cap 10 is then rotated using the gripping indentations 42 and gripping protuberances 43 located on the outer portion 38 to secure the cap 10 to the cover 4 by threading the threads 44 of the inner member 36 into the threads 34 of the body 8. As the cap 10 is rotated, the seal 16 forms a compressed sealing surface against the outside surface 50 of the enclosure 14. The collapsible ribs 30 militate against the cover 4 spinning within the hole 12 when the threads 34 receive the threads 44.

The structure described in the foregoing disclosure allows the cover 4 of the hole seal 2 to fit in various holes 12 having different diameters or widths. Specifically, the collapsible ribs 30 collapse in a predetermined direction to the extent necessary to fit in the hole 12. The resilient effect of the ribs 30 also aids the center the body 8 of the cover 4 in the hole 12 if misalignment has occurred. The ribs 30 also militate against rotation of the cover 4 when the cap 10 is installed and after installation is complete.

FIG. 4 illustrates a hole seal 2' according to another embodiment of the present invention similar to the hole seal 2 of FIGS. 1-3, except as described below. Variations of structure shown in FIGS. 1-3 include the same reference numeral and a prime (') symbol. As shown in FIG. 4, the hole seal 2' includes a cover 4' and a cap 10'. It is understood that additional components and systems may be included in the hole seal 2', as desired.

The inner member 36' may include a plurality of ratcheting teeth 45 disposed thereon, as shown in FIG. 4. The teeth 45 are received in the threads 34' formed on the inner surface 26' of the body 8' when the inner member 36' is received in the body 8', thereby securing the cap 10' to the cover 4'. It should be understood that the threads 34' could take the form of traditional female threading or they may be in the form of grooves or undercuts formed in the inner surface 26' of the body 8'. The grooves or undercuts may be configured to cooperate with the teeth 45 of the inner member 36' to attach the cap 10' to the cover 4' by pushing the inner member 36' into the body 8' without any additional turning of the cap 10' or cover 4', creating a form of snap fit attachment. A snap fit attachment may be desirable for applications where the environmental factors surrounding the enclosure 14 do not require that a fluid-tight seal be formed between the cover 4' and the outer surface 50 of the enclosure 14. This may occur in enclosures 14 found indoors and not exposed to excessive moisture, for example.

The teeth 45 typically have an angled surface 47 that allows the inner member 36' to be pressed into the threads 34' of the body 8' and a flat surface 49 that inhibits the inner member 36' from being removed from the body 8'. The flat surface 49 extends from and is arranged perpendicular to the outer surface 28' of the body 8', while the angled surface 47 is angled relative to the flat surface 49. The combination of an angled surface 47 and a flat surface 49 allows the teeth 45 to act as ratchets. Additionally, the outer surface 46' of the inner member 36' may include male threads for threading the inner member 36' to the body 8' after the teeth 45 are pressed into the threads 34'. Accordingly, the teeth 45 may be disposed adjacent a free end of the inner member 36' to be received in the body 8' during installation, while the male threads may be disposed between the teeth 45 and a second end of the inner member 36' where the inner member 36' attaches to the remainder of the cap 10'. In some embodiments of the disclosure, the teeth 45 may also be used as male threads, thereby eliminating the need for two separate components.

If the teeth 45 are utilized, as shown in FIG. 4, the inner member 36' may also include one or more slots or gaps 37 through a longitudinal axis of the inner member 36'. The one or more slots or gaps 37 allow the inner member 36' to compress as the inner member 36' is inserted into the body 8' of the cover 4'. This compression allows the angled surface 47 of the teeth 45 to more easily pass by the female threads 34' of the body 8' during insertion of the inner member 36' therein. Once the teeth 45 pass by the female threads 34', the teeth 45 will spring back to their original position, and the flat surface 49 will aid in retaining the inner member 36' within the body 8'.

During installation, the teeth 45 are received in the threads 34' and the cap 10' is rotated typically 180 degrees or less, thereby threading the teeth 45 or the male threads disposed on the outer surface 46' of the inner member 36' into the threads 34' disposed on the inner surface 26' of the body 8'. The teeth 45 and the male threads allow for easy, fast assembly of the hole seal 2'. The teeth 45 can be quickly inserted into the threads 34' and the hole seal 2' can be quickly tightened with a 180 degree turn of the cap 10'. The 180 degree turn tightens the cap 10' and the cover 4' in place with respect to the enclosure 14 and allows for proper compression of the seal 16' against the outer surface 50 of the enclosure 14, forming an appropriate seal. It should be understood, however, that if the threads 34' are configured to cooperate with the teeth 45 to form a snap fit attachment, as described hereinabove, the cap 10' will not require additional turning. In the case of a snap fit attachment, the inner member 36' is pushed into the body 8' until the cover 4' and the cap 10' both abut the enclosure 14.

The ribs 30' are disposed parallel to one another along a longitudinal axis of the body 8' and extend radially outwardly from the outer surface 28' of the body 8'. The ribs 30' are formed in a series of layers, each layer including a plurality of ribs 30' spaced apart around a circumference of the outer surface 28' of the body 8', forming an annular array of the ribs 30'. Each successive layer of the ribs 30' would substantially correspond in form and number of ribs 30' as an adjacent layer. The number of ribs 30' in each layer and the number of layers can be selected as desired.

The parallel ribs 30' aid in centering the cover 4' in the hole 12 as well as securing the cover 4' in the hole 12 when the cap 10' is threaded into the cover 4'. First, the user selects an appropriate cover 4' and cap 10' to properly cover and seal the hole 12. The user then extends the body 8' into the hole 12. The parallel ribs 30' flex as each successive layer of the ribs 30' contact an edge formed between the inner surface 52 forming the hole 12 and the outer surface 50 of the enclosure 14. The flexibility and resiliency of the ribs 30' will tend to realign the cover 4' as it passes through the hole 12 because the ribs 30' undergoing the greatest degree of flexing will also display the greatest degree of resilient force, realigning the cover 4' away from the direction of misalignment. Once the cover 4' has been inserted in the hole 12 to the extent that the seal 16' abuts the outer surface 50 of the enclosure 14, two successive layers of the ribs 30' will surround the inner surface 52 forming the hole 12. The ribs 30' that surround the inner surface 52 of the enclosure 14 aid in securing the cover 4' in place while the cap 10' is further secured to the cover 4'.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A hole seal for sealing a hole formed in a wall, the wall having a first surface, an oppositely arranged second surface, and an inner surface defining the hole, the hole seal comprising:
    a cover including a body and a seal, the seal disposed on an inner surface of the cover and configured to engage the first surface of the wall, the body extending longitudinally from an inner surface of the cover and having an open end, the body including an annular array of flexible ribs extending radially outwardly from an outer surface thereof configured to engage the inner surface defining the hole when the seal engages the first surface of the wall to center the cover with respect to the hole; and
    a cap having an inner member and an annular surface formed around the inner member, the inner member is configured to be received in the open end of the body to couple the cap to the cover, the annular surface configured to engage the second surface of the wall following a coupling of the cap to the cover.

2. The hole seal of claim 1, wherein the open end of the body provides access to an inner surface of the body, the inner surface of the body including a threaded portion configured to cooperate with a threaded portion formed on an outer surface of the inner member to couple the cap to the cover.

3. The hole seal of claim 1, wherein the body is hollow and substantially cylindrical.

4. The hole seal of claim 1, wherein each of the ribs and is attached to the outer surface of the body along an area of attachment extending substantially parallel to a longitudinal axis of the body.

5. The hole seal of claim 1, wherein each of the ribs has a predetermined curvature causing each of the ribs to have a predetermined collapsible position when a radially inward force is applied to each of the ribs by the inner surface of the wall defining the hole.

6. The hole seal of claim 1, wherein each of the ribs includes a tapered edge.

7. The hole seal of claim 6, wherein a first edge of each rib disposed adjacent the inner surface of the cover extends radially outwardly from the outer surface of the body further than a second edge of each rib disposed adjacent the open end of the body.

8. The hole seal of claim 1, wherein each of the ribs is resilient.

9. The hole seal of claim 1, wherein the inner member further includes at least one slot removed from a longitudinal axis of the inner member to allow the inner member to compress during insertion into the body of the cover.

10. A hole seal for sealing a hole formed in a wall, the wall having a first surface, an oppositely arranged second surface, and an inner surface defining the hole, the hole seal comprising:
    a cover including an end portion and a body, wherein the body is hollow and substantially cylindrical, the body having a first end attached to an inner surface of the end portion and an open second end, a longitudinal axis of the body extending from the first end to the second end of the body, the body further having an inner surface and an outer surface, the outer surface of the body including an annular array of flexible ribs extending radially outwardly therefrom, the end portion including a seal disposed on the inner surface thereof configured to engage the first surface of the wall, the annular array of flexible ribs configured to engage the inner surface defining the hole when the seal engages the first surface of the wall to center the cover with respect to the hole; and
    a cap having an inner member and an outer portion, the inner member configured to cooperate with the inner surface of the body to couple the cap to the cover; the outer portion forming an annular surface that substantially corresponds to the seal, the annular surface configured to engage the second surface of the wall when the cap is coupled to the cover.

11. The hole seal of claim 10, wherein each of the ribs extends radially outwardly from the outer surface of the body and the ribs are spaced apart from each other by a portion of a circumference of the outer surface of the body.

12. The hole seal of claim 10, wherein each of the ribs has a predetermined curvature as each of the ribs extends away from the outer surface of the body, causing each of the ribs to curl about a portion of a circumference of the outer surface of the body.

13. A hole seal for sealing a hole formed in a wall, the wall having a first surface, an oppositely arranged second surface, and an inner surface defining the hole, the hole seal comprising:
a cover including an end portion and a body, wherein the body is hollow and substantially cylindrical, the body having a first end attached to an inner surface of the end portion and an open second end, a longitudinal axis of the body extending from the first end to the second end of the body, the body further having an inner surface and an outer surface, the outer surface of the body including an annular array of flexible ribs disposed thereon, wherein each of the ribs extends radially outwardly from the outer surface of the body and each of the ribs is attached to the outer surface of the body along an area of attachment extending from the first end of the body to the second end of the body, wherein each of the ribs is resilient and has a predetermined curvature causing each of the ribs to have a predetermined collapsible position;
an annular seal disposed on the inner surface of the end portion of the cover configured to engage the first surface of the wall, wherein the annular array of flexible ribs is configured to engage the inner surface of the wall defining the hole when the annular seal engages the first surface of the wall to center the cover with respect to the hole; and
a cap having an inner member and an outer portion, the inner member configured to cooperate with the inner surface of the body to couple the cap to the cover; the outer portion forming an annular surface that substantially corresponds to the annular seal, the annular surface configured to engage the second surface of the wall when the cap is coupled to the cover.

14. The hole seal of claim 1, wherein the ribs are spaced apart from each other by a portion of a circumference of the outer surface of the body.

15. The hole seal of claim 5, wherein each of the ribs curls about a portion of a circumference of the outer surface of the body.

16. The hole seal of claim 1, wherein each of the ribs is attached to the outer surface of the body along an area of attachment, the area of attachment of each of the ribs extending longitudinally from a first end adjacent the inner surface of the cover to a second end adjacent the open end of the body.

17. The hole seal of claim 16, wherein the annular surface of the cap defines a plane and the first end of each of the areas of attachment is disposed to a first side of the plane and the second end of each of the areas of attachment is disposed to a second side of the plane when the cap is coupled to the cover.

18. The hole seal of claim 16, wherein the seal includes a sealing surface configured to engage the first surface of the wall, the sealing surface defining a plane, wherein the first end of each of the areas of attachment is disposed between the plane defined by the sealing surface and the end of the body formed adjacent the inner surface of the cover.

19. The hole seal of claim 1, wherein at least a portion of each of the ribs is disposed between the seal and the annular surface in a longitudinal direction of the body when the seal engages the first surface of the wall and the annular surface engages the second surface of the wall.

\* \* \* \* \*